US007445191B2

(12) United States Patent
Courbon

(10) Patent No.: US 7,445,191 B2
(45) Date of Patent: *Nov. 4, 2008

(54) KEY SYSTEM FOR A MIRROR ASSEMBLY

(75) Inventor: Emmanuel Courbon, Columbia, SC (US)

(73) Assignee: Lang Mekra North America, LLC, Ridgeway, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/796,108

(22) Filed: Apr. 26, 2007

(65) Prior Publication Data

US 2007/0194203 A1    Aug. 23, 2007

Related U.S. Application Data

(63) Continuation of application No. 10/857,203, filed on May 28, 2004, now Pat. No. 7,240,888, which is a continuation-in-part of application No. 10/227,628, filed on Aug. 23, 2002, now Pat. No. 6,814,336.

(51) Int. Cl.
*A47G 1/24* (2006.01)

(52) U.S. Cl. .................... 248/479; 248/476; 359/872

(58) Field of Classification Search ............. 248/475.1, 248/476, 478, 479, 482, 477, 224.61, 225.11, 248/481; 403/300, 309, 359.6, 361; 359/871, 359/872
See application file for complete search history.

(56) References Cited

U.S. PATENT DOCUMENTS

| 3,346,229 | A | * | 10/1967 | Carson, Jr. | ............... 248/477 |
| 3,784,149 | A | * | 1/1974 | Brudy | ............... 248/478 |
| 4,186,905 | A | * | 2/1980 | Brudy | ............... 248/478 |
| 6,814,336 | B2 | * | 11/2004 | Courbon | ............... 248/478 |
| 7,240,888 | B2 | * | 7/2007 | Courbon | ............... 248/477 |

* cited by examiner

*Primary Examiner*—A. Joseph Wujciak, III
(74) *Attorney, Agent, or Firm*—McNair Law Firm, P.A.

(57) ABSTRACT

A locking system for adjustably mounting a mirror mounting support arm with a motor vehicle which includes a locking device for securing with a motor vehicle having a recess at one end for receiving an end of a support arm. The recess is formed with a stem having at least one key formed along its length. The support shaft end is formed with at least one slot which is sized and located to matingly fit with the key. The system also includes an anchor plate for securing with the vehicle which is also adapted to mount a support arm holder. The support arm holder includes a body portion having a shoulder adjacent one end and a recess. The recess is formed with a stem therein and a key along the stem. This recess is adapted to receive a second end of the support arm. In use, the first and second support arm ends are inserted into the recesses about the stems with the slots engaged by the keys. Adhesive is applied firmly securing the support shafts in fixed position with the locking device and the support arm holder.

4 Claims, 4 Drawing Sheets

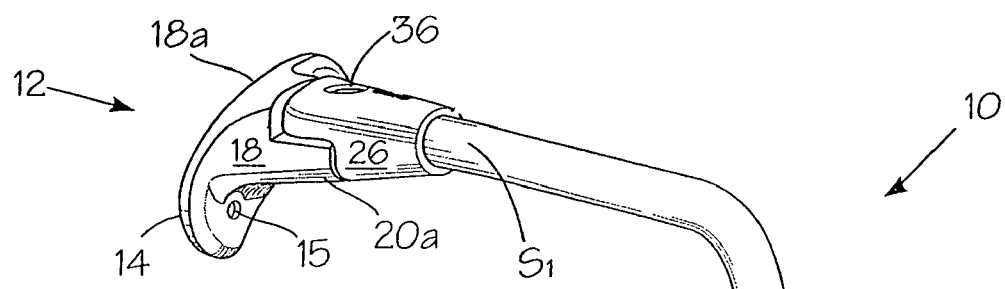
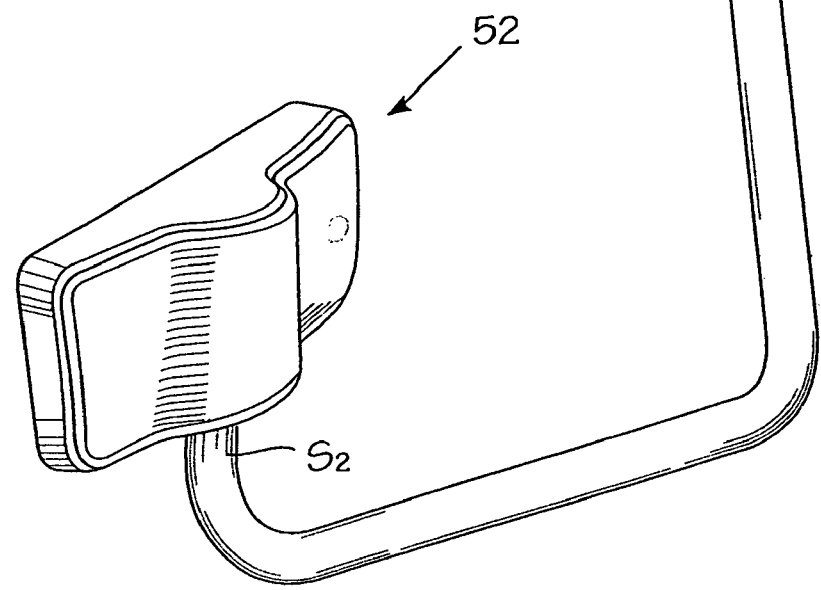
Fig. 1 ment to the support arm and to reduce manufacturing tolerances and costs. The system also includes a brace which cooperates with the locking device to receive another portion of the support arm to mount the support arm to the motor vehicle. The brace includes an anchor and a support arm holder to fix the support arm relative to the brace.

KEY SYSTEM FOR A MIRROR ASSEMBLY

CROSS REFERENCE TO RELATED APPLICATION

This application is a continuation of application Ser. No. 10/857,203, filed May 28, 2004 now U.S. Pat. No. 7,240,888, which is a continuation-in-part of application Ser. No. 10/227,628, filed Aug. 23, 2002, now U.S. Pat. No. 6,814,336 B2, issued Nov. 9, 2004, having the same title.

FIELD OF THE INVENTION

The present invention relates to a rearview mirror assembly, particularly a locking device for mounting mirrors on commercial vehicles such as trucks.

BACKGROUND OF THE INVENTION

Rearview mirror assemblies for vehicles, particularly for commercial trucks, are well known in the art. These well known mirror assemblies include many different arrangements for mounting mirror assemblies on the vehicles. On large, commercial vehicles, such as trucks and busses, mirrors are often secured within mirror housings mounted so as to extend the mirror out from the vehicle thereby providing a clear view of different areas around the vehicle. Depending on the size and design of the mirror, as well as the area around the vehicle to be observed, different mounting arrangements have been used. A typical mounting arrangement includes a bar extending outwardly from the vehicle, often in substantially a U-shape, in which the ends of the U-bar are attached to the side of the vehicle. Alternately, a bar may be attached to the vehicle at only one end, with a mirror housing being disposed at a distal end or central portion, or both, of such bar. In either of such applications, mounting bars are typically attached to each side of the driver's cab of a truck, and the mirror housing is attached to the central portions of the bars in various ways.

Some conventionally mounting arrangements suffer from complicated constructions requiring, for instance, adapters, multiple piece connectors, and a variety of screws, bolts and the like to attach the bar to the mounts and to the vehicle. Such complicated mounting arrangements are more cumbersome, costly and labor intensive than may be desired.

BRIEF SUMMARY OF THE INVENTION

In general, the present invention provides a locking key system for a motor vehicle for adjustably mounting a mirror attached to a support arm. The component parts of the locking key system are simple, reliable, and economical to manufacture and use. For instance, the locking key system has relatively few parts and quickly locks and unlocks from the support arm. Other aspects and advantages of the invention will be apparent from the following description and the attached drawings, or can be learned through practice of the invention.

In one aspect of the invention, the key system includes a locking device configured to receive a portion of the support arm to mount the support arm to the motor vehicle. The locking device includes an extension, a complementary extension, and a key. Further, a spring or similar device is included to urge the extension and the complementary extension together. The extension and complementary extension respectively define a spherical surface and a complementary spherical surface. The spherical surface and complementary spherical surface are matingly arranged to provide a finite range of movement to the support arm and to reduce manufacturing tolerances and costs. The system also includes a brace which cooperates with the locking device to receive another portion of the support arm to mount the support arm to the motor vehicle. The brace includes an anchor and a support arm holder to fix the support arm relative to the brace.

In another aspect, the invention provides an assembly arrangement in which opposed ends of the support arm are provided with at lest one shaped slot. The complementary extension and the support arm holder are each provided with a recess adapted to receive and engage with the outer portion of support arm end. Within each recess extending along its axis is provided a stem which is adapted to engage with the inner portion of each support arm end. A key is formed along and axially of the outer portion of the stem. The key is designed to mate with the slot in the support arm ends.

The mirror support is assembled by coating at least one of the recess, the stem and the support arm ends. The support arm ends are then inserted into the recesses with the slots mating with keys providing for accurately locating the support arms with the complementary extension and the support arm holder. The key, slot arrangement also provides for increased securement of the support arm end against rotation.

In another aspect, the invention provides a method for assembling a mirror mounting assembly. The method includes the steps of providing a locking device comprising an extension and a complementary extension which mate together, a key in which includes an insertion end which defines a mating shoulder, and a spring disposed about the key. The complementary extension receives a portion of a support arm to mount the support arm to a motor vehicle. Further steps include inserting the key through an aperture in the extension and a complementary aperture in the complementary extension; increasing an axial pressure on the inserted key to compress the spring about the key; rotating the inserted key; and releasing the inserted key such that the mating shoulder cooperates with the complementary extension to maintain compression on the spring to movably hold the extension and complementary extension together.

BRIEF DESCRIPTION OF THE DRAWINGS

Further details of the invention may be found in the following detailed description of the invention with the aid of the drawings in which:

FIG. 1 is a perspective view of a mirror mounting assembly in accordance with an aspect of the invention, as used on a vehicle;

FIG. 3a is an exploded sectional cutaway view of the complementary extension showing the key structure;

FIG. 3b is similar to FIG. 3a showing the relationship of the recess, support arm end and the adhesive; and, FIG. 4 is an exploded cutaway view of the anchor.

DETAILED DESCRIPTION OF THE DRAWINGS

Figure 2:
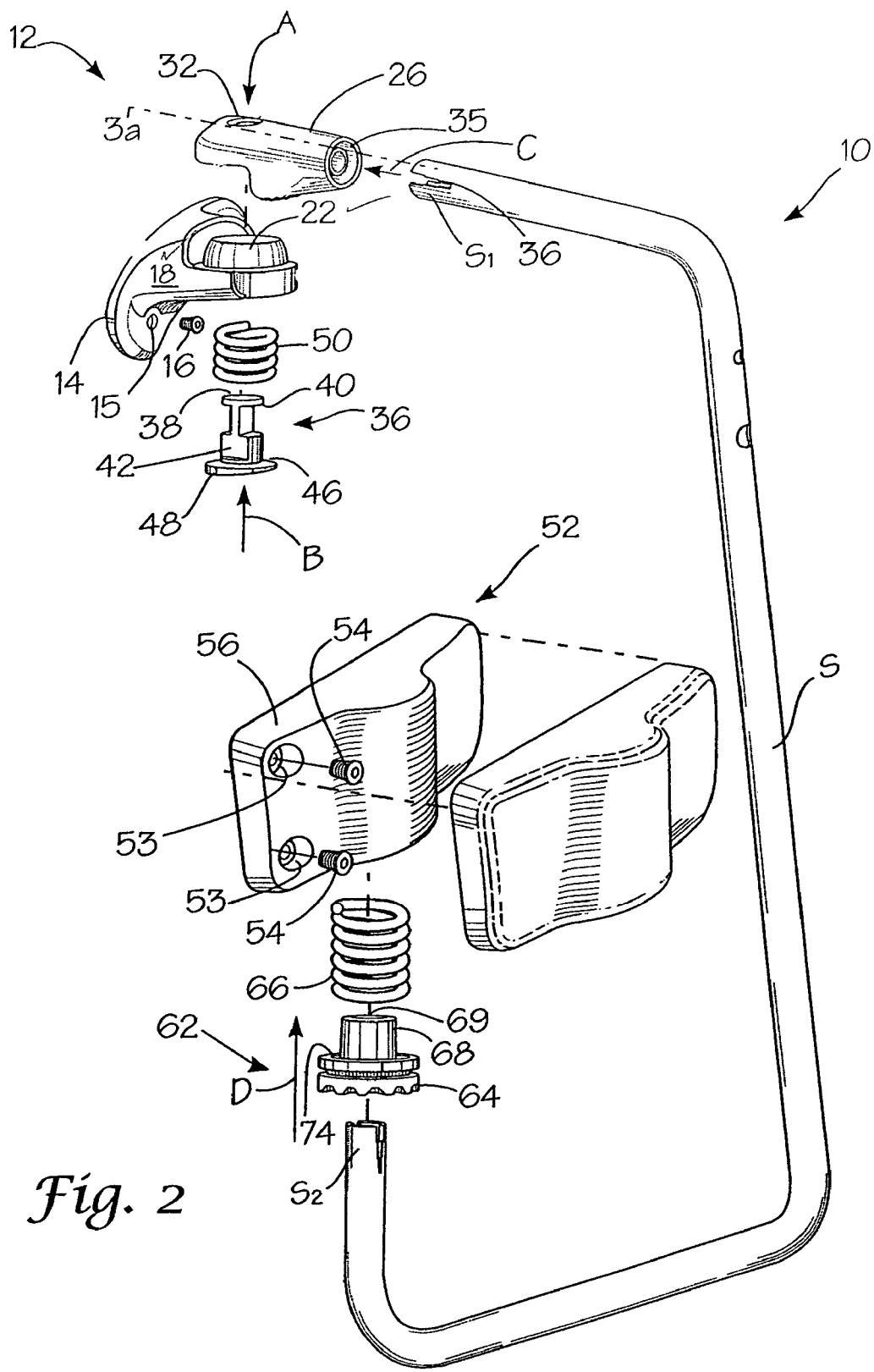
FIG. 2 is an exploded view of the mirror mounting assembly as shown in FIG. 1.

Detailed reference will now be made to the drawings in which examples embodying the present invention are shown. The drawings and the detailed description provide a full and detailed written description of the invention, and of the manner and process of making and using it, so as to enable one skilled in the art to make and use the invention, as well as the best mode of carrying out the invention. However, the examples set forth in the drawings and detailed description are provided by way of explanation of the invention and are not meant as limitations of the invention. The present invention thus includes any modifications and variations of the following examples as come within the scope of the appended claims and their equivalents.

The detailed description uses numerical and letter designations to refer to features in the drawings. Like or similar designations in the drawings and description have been used to refer to like or similar parts of the invention.

One exemplary embodiment of a locking key system for a mirror assembly according to the present invention is broadly embodied in FIGS. 1-4. The locking key system, generally designated by the numeral 10, as shown in FIG. 1 with a locking device 12 and a brace 52 to which a mirror assembly support arm S is attached. A mirror assembly (not shown) is attachable to the support arm S, and the entire locking key system 10 with support arm S and mirror assembly is attached to a vehicle (not shown). It is to be understood that support arm S may be any sort, size, or shape of mounting bar, tube, rod or the like. Likewise, any type of mirror assembly may be utilized according to the present invention. As will be described in more detail below, the support arm S is attached by its respective end portions $S_1$ and $S_2$ to the locking device 12 and the brace 52 to mount the support arm S and its mirror assembly to the vehicle.

Figure 3:
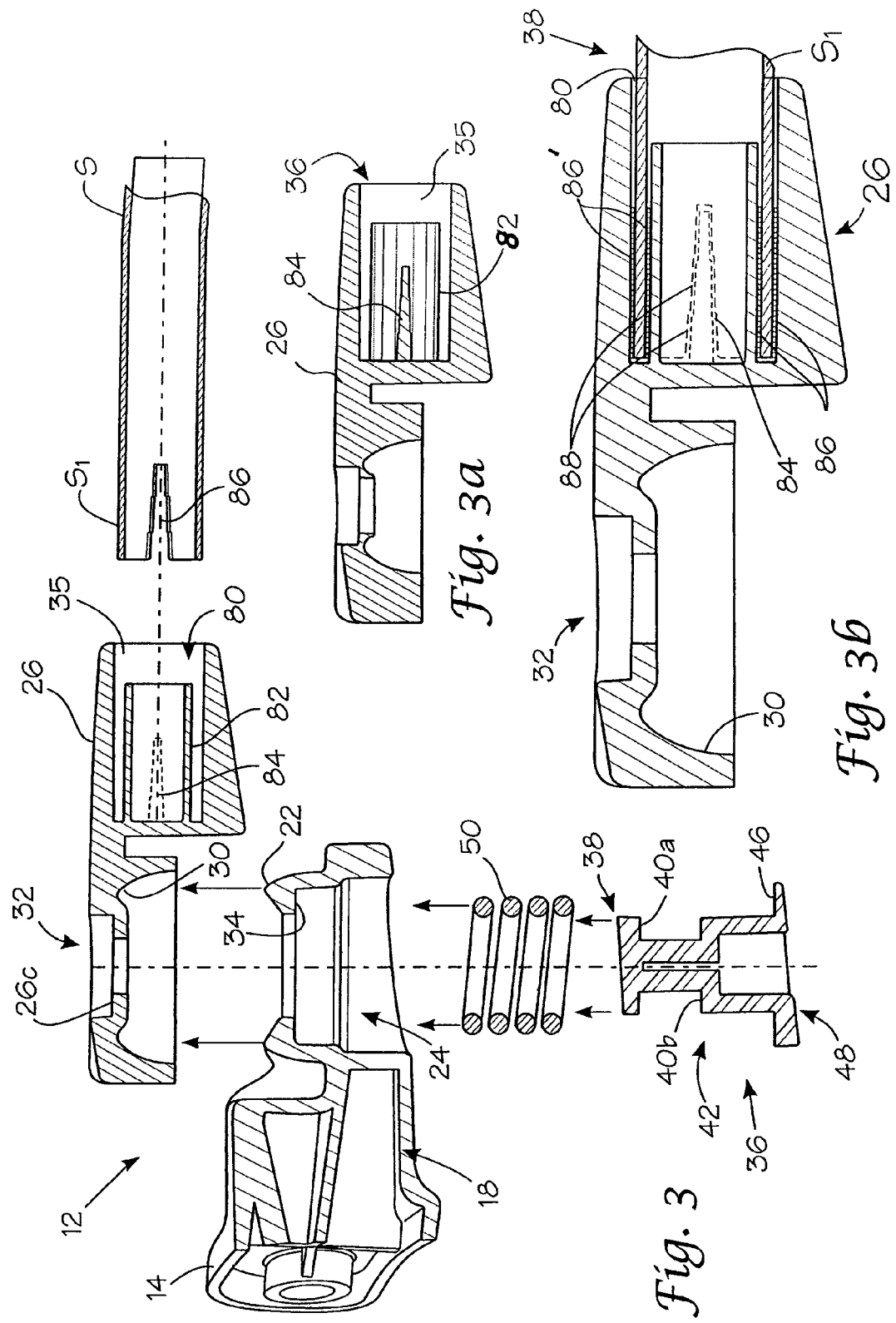
FIG. 3 is an exploded sectional side view of the mirror locking device.
Figure 4:
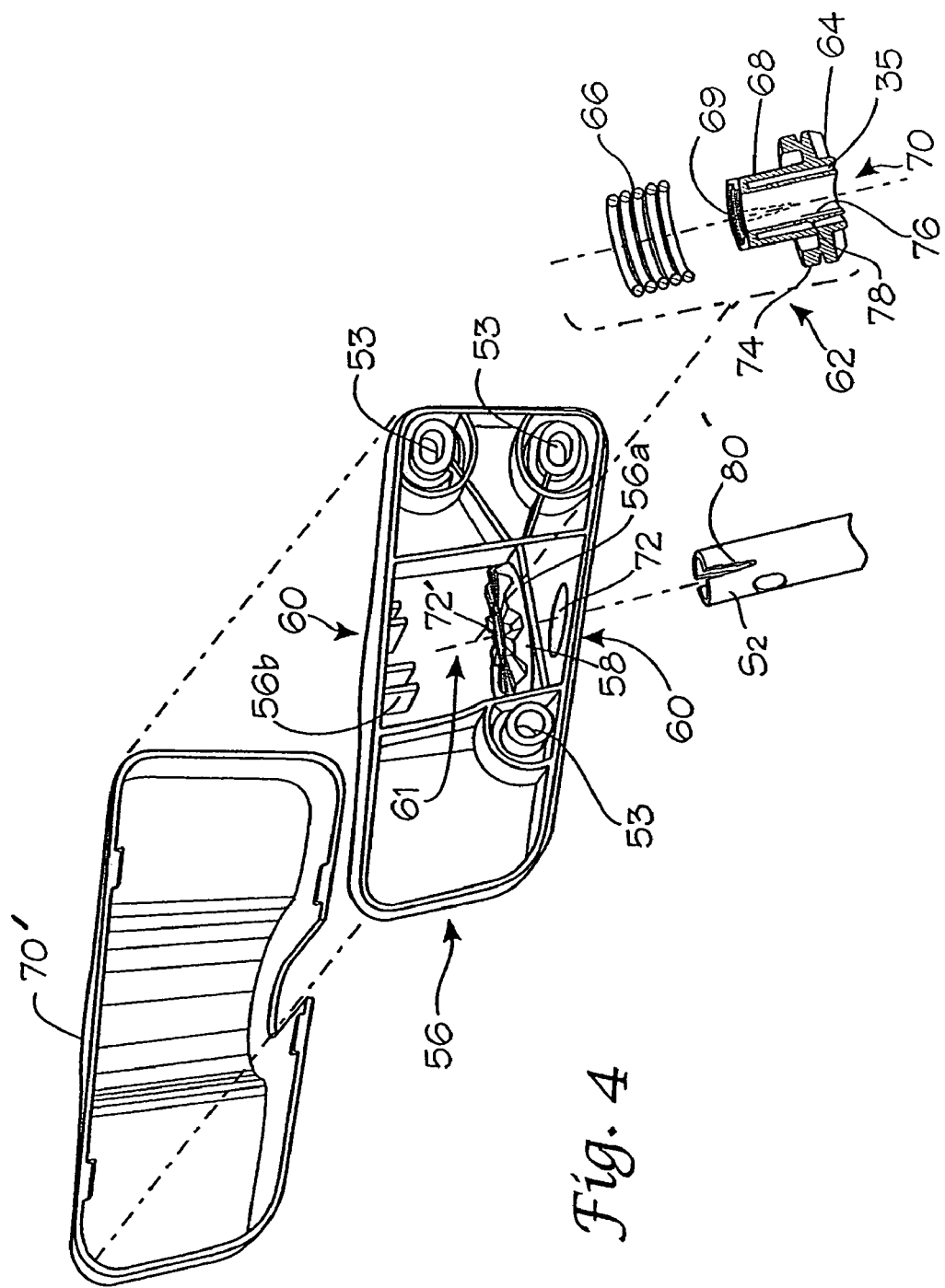

The locking device 12 and the brace 52 and their related components are shown in greater detail in FIGS. 2-4. As shown therein, the locking device 12 and brace 52 have respectively a plurality of holes 15, 53 for receiving respective screws 16, 54. (See FIG. 2). The screws 16, 54 are inserted through their respective holes 15, 53 to attach the locking key system 10 to the vehicle. It is to be understood that these holes 15, 53 and screws 16, 54 are provided by way of example only and are not intended to limit the invention to this form of vehicle attachment. For instance, screws 16, 54 can be pins, rivets, bolts and similar devices. Moreover, suction devices or other non-penetrating forms of attachment in lieu of or in addition to the holes 15, 53 and screws 16, 54 are contemplated by the invention.

With particular reference to FIGS. 2, 3, 3a, 3b the locking device 12 is shown with an attachment element 14, an extension 18, a complementary extension 26, a locking key 36, and a helical spring 50. The attachment element 14 may be a separate component of the locking device 12, but as shown in this example is unitarily formed with the extension 18 of a lightweight material. This material may be elastomeric material, a plastic, a high density polyethylene, a polymer, a polyoxymethylene (acetal plastic) material or similar moldable materials. If desired, wood or various metals can be used.

In one aspect of the invention, structural or engineered plastics are utilized, which offer strength, durability and light weight. Such structural plastics include glass-filled plastics, such as glass-filled nylon, fiberglass, and KEVLAR® available from DuPont™, Spruance, Va.

If moldable lightweight materials are used, the attachment element 14 including extension 18 can be unitarily constructed by blow-molding, injection molding, press-forming and similar processes. Accordingly, the components of the locking device 12 including the complementary extension 26 may be formed to any desired shape or size.

The locking key 36, seen most clearly in FIGS. 2 and 3, is a bayonet-type key in this example, which defines an insertion or engagement end 38, a key body 42, and a control end 48. The locking key 36 is at least partially received within the spring 50, which is sufficiently large to fit about the diameter of insertion end 38 of the locking key 36 but not so large as to slip past a mating surface 46 of the control end 48. The locking key 36 and spring 50 are then inserted into an aperture or opening 24 of the extension 18 and into a complementary aperture or opening 32 of the complementary extension 26 to lock the locking device 12 together. The apertures or openings 24, 32 define respective diameters which are sufficiently large to accept the diameter of the locking key 36 therethrough. FIG. 1 shows the completed operation of the locking key 36 carrying spring 50 in locking position in the locking device 12, as will be described in greater detail below.

Seen most clearly in FIGS. 1-3, the extension 18 and the complementary extension 26 are complementarily shaped to fit closely together. The extension 18 and the complementary extension 26 respectively define a first surface having a spherical surface 22, and a first complementary surface with a first complementary spherical surface 30, which are designed to movably mate together. However, the extension 18, the complementary extension 26, and their respective spherical surfaces 22, 30 are not necessarily exact shape-fits. As will be explained in greater detail below, this arrangement permits some interplay between the extension 18 and the complementary extension 26 to allow a degree of three-dimensional adjustment between undefined positions to the support arm S. It should also be understood that a plurality of different designs of extensions and spherical surfaces are within the scope of the present invention. For example, a second complementary extension with a second complementary spherical surface can be provided to movably mate with another spherical surface opposite the spherical surface 22. The locking key 36, described below, would be designed to operatively penetrate this second complementary extension, or two such keys could be provided.

FIGS. 2 and 4 further show brace 52 with a support arm holder 62 and a helical brace spring 66. An optional detachable cover 70' is shown in this example for covering anchor piece 56. The detachable cover 70' may be aesthetically desirable to cover the holes 53 and screws 54 described above if such an attachment is utilized, and/or to provide an outer surface of a selected color. The brace 52, the support arm holder 62, and/or the cover 70' may be formed of the lightweight materials introduced above with respect to the locking device 12.

With reference to FIGS. 2 and 4, the brace 52 further includes an anchor piece 56 having cavity 61 within generally centered anchor area 60. Conduits 72, 72' provide access into cavity 61. The anchor piece 56 defines a surface or shelf 56a and at least one stop 56b within the cavity. A plurality of teeth 58 extend from the shelf 56a. The plurality of teeth 58 are arranged on the upper surface of shelf 56a. Aperture 72' is aligned with aperture 72 and is arranged centrally of teeth 58. The teeth together with the stop 56b cooperate with teeth 64 and a compressed brace spring 66 of support arm holder 62 to fix the support arm holder between defined adjusted positions within the cavity of brace 52.

Turning now to FIGS. 3, 3a and 3b, complementary extension 26 includes a recess 80 at end 35 which is sized to receive and engage about the outer surface end $S_1$ of support arm S. The recess is sized to be slightly larger or so that its inner surface is slightly spaced from the outer surface of the support arm end and preferably of a size to easily receive the end in a slightly snug fit. At the inner end and along the axis of recess 80 is provided a generally circular stem 82 which extends outwardly to a point slightly short of end 35. Stem 82 is sized to be just slightly smaller than the inner diameter of end $S_1$ of support arm S or so that its outer surface is slightly spaced from the inner surface of the support arm so as to be received within end $S_1$ in a slightly snug fit.

Formed along opposed sides and parallel with the axis of stem 82 is a shaped protrusion in the form of key 84, best seen in FIG. 3a. Preferably there are a pair of parallel keys formed on opposed sides of stem 82, however, there could be only one or there could be more than two preferably equally spaced about the stem.

Each key 84 can merge and be integral with the inner surface of recess 80 or it can be formed with stem 82 to project outwardly to a point just short of the inner surface of the recess. Each key 84 is preferably stepped inwardly from the inner end of recess 80 toward end 35 as clearly shown in FIG. 3 or it could be tapered or planar. Key 84 is therefore generally configured with a somewhat wide inner end which essentially tapers toward its forward end.

End $S_1$ is inserted into recess 80 with, the slot or slots 86 aligned with the key or keys 84. Continued insertion into recess 80 causes the keys to fully engage in the slots the locking support arm in axial position against rotation.

In the preferred arrangement an adhesive 86' is applied about the end $S_1$ of the support arm and/or within the recess 80 prior to insertion of end $S_1$ into the recess. When end $S_1$ is positioned over stem 82 the adhesive securely bonds the support arm with complementary extension 26 as shown in FIG. 3b.

It is noted that stem 82 may be formed integral with complementary extension 26 or may be formed separated and joined with the extension. Also, stem 82 may be solid member or it may be hollow as shown.

The locking device 12 is easily assembled by simply mating the extension 18 with the complementary extension 26 as shown in FIGS. 1-3. The locking key 36 and spring 50, as briefly described above, are then inserted in a direction B into the aperture or opening 24 of the extension 18 and through the complementary aperture or opening 32 of the complementary extension 26, substantially perpendicular to the extensions 18, 26 in this example. The exemplary spring 50 defines a spring constant, which resists compression. However, continued insertion pressure in direction B on the locking key 36 compresses the spring 50 between a circumferential inner surface or shoulder 34 of the extension 18 and a mating surface or ledge 46 of the control end 48 of locking key 36. In this example, the diameter of the insertion end permits the insertion end 38 to pass through the complementary aperture 32 under the continued insertion pressure. Although not shown, a momentary gap is eventually achieved as a ledge or shoulder 40a of the locking key 36 is spaced apart from a circumferential shoulder 26c of the complementary extension 26 (to the extent allowed by a spacing or gap between a second limiting shoulder 40b and the inner surface or shoulder 34 and the physical presence of spring 50. During this momentary gap between the shoulder 26c and the shoulder 40a, the locking key 36 can be rotated 90 degrees or one-half turn, for instance, and released. The spring constant of the spring 50 forces the shoulder 40a of engagement end 38 and the shoulder 26c adjacent opening 32 together to assume a locked position as shown in FIG. 1.

It is to be understood that any spring constant mechanism may be used in place of or in addition to spring 50 in the foregoing example. For instance, a circumferentially shaped rubber gasket, o-ring or similar devices defining a similar spring constant as spring 50 can be suitably substituted. It is to be further understood that the specific shapes and elements of the locking key 36 are shown by way of example only and do not limit the invention to the particular exemplary locking key 36. For instance, the locking key 36 could be two or more components which attach together proximate the gap G. Likewise, the shapes of shoulders 26c, insertion end 36, and shoulder 40a could be inclined or camming surfaces or a variety of other matable arrangements and remain within the invention's scope.

As briefly introduced, the extension 18 and the complementary extension 26 respectively include spherical surface 22 and complementary spherical surface 30. The spherical surfaces 22, 30 are designed to movably mate together. According to this aspect of the invention, a spherical-conical combination utilizing partial hemispheres and cones that slope from about 0 degrees to about 35 degrees leverage or multiple pressure to create higher friction. In contrast, flat surfaces, e.g. two horizontal planar surfaces mated together, require very high pressure to achieve the same locking result with a spring.

In this example, the spherical surface 22 slopes approximately 10 degrees from vertical, designated generally by the axis shown in FIG. 3. By comparison, the complementary spherical surface 30 slopes approximately 20 degrees from this axis to permit some interplay between the spherical surfaces 22, 30. Thus, the extension 18 and the complementary extension 26 are spherically fitted to allow a degree of three-dimensional movement of the support arm S between undefined positions. Such adjustability is useful for example, to make tolerances less critical during manufacturing and to relive stresses on the device in use. In contrast, if the spherical surfaces 22, 30 were each closer to 7-8 degrees from vertical, a "locking taper" or total locking fit between the spherical surfaces 22, 30 could occur. Although this may be desirable in some cases and a range of about 5 degrees to about 30 degrees is within the scope of the present invention, it should be noted that it will substantially prevent movement of the extension 18 and the complementary extension 26 to adjust the support arm S. It is to be further noted that it is within the scope of the invention to substitute or modify spherical surfaces 22, 30 with other shapes such as pyramids, squares, rectangles, cylinders and the like, including adding detent elements in the spherical surfaces 22, 30 or any of the foregoing shapes for fixed adjustments of the support arm S. Further, it is also within the scope of the invention to add hard stops (not shown) on one or both extensions 18, 26 to prevent the support arm S from adjusting beyond a desired envelope of movement. Stops are known and further discussion is not needed to appreciate this aspect of the invention.

As seen in FIGS. 2 and 4, the brace 52 is structured to form an anchor piece 56 having cavity 61 between the lower surface of stop 56b and teeth 58 formed on the upper surface of shelf 56a. Anchor piece 56 is assembled by placing spring 66 over body 68 and into engagement with shoulder 74 of support arm holder 62, compressing spring 66 and inserting the spring and support arm holder 62 into cavity 61. Teeth 64 of the support arm holder are positioned to mate with teeth 58 carried by shelf 56a to prevent rotation of the support arm holder and to allow adjustment of the support arm S between fixed positions. A conduit 72' is located centrally of teeth 58. Cavity 61 including teeth 58 and stop 56b define an anchor for support arm holder 62.

Support arm holder 62 includes a recess 70 which extends from shoulder 74 to mating end 69. When the support arm holder is positioned in cavity 61 as described, the recess is aligned with conduits 72, 72'. End $S_2$ of support arm S is inserted through conduits 72, 72' into recess 70 in support arm holder 62 and secured therein with an adhesive. In this condition, teeth 58 of shelf 56a and complementary teeth 64 of support arm holder 62 cooperate to prevent support arm S from rotational movement. Spring 66 is compressed between stop 56a and shoulder 74 of support arm holder 62 urging teeth 58 and 64 in fixed relative positions. The stop 56b is illustrated as a plurality of rectangular-shaped projections spaced apart from each other and depending into the cavity 61. However, any form or arrangements of stops as known in the art may be suitably utilized for stop 56b.

Recess 70 to include stem 76 is structured in the manner of recess 80 as earlier described. Recess 70 is formed with a stem 76 extending from mating end 69 to a point just short or even with the lower end of support arm holder 62. Stem 76 includes one or more keys 78 formed axially along its periphery. Keys 78 are preferably stepped but may be of any desired shape. Support arm end $S_2$ includes a slot or a plurality of slots formed about its periphery and aligned with the positions of the key or keys 78 formed about stem 76. Slots 80 are designed to receive keys 78 when support shaft end $S_2$ is engaged in recess 70 of support arm holder 62 to form a locked securement against rotations of the support arm relative to the support arm holder.

It is preferred that an adhesive be applied prior to inserting end $S_1$ into recess 70 as previously described.

Also, as with spring 50, various other devices may be substituted for the spring 66 in the brace 52, such as o-rings, rubber gaskets and similar mechanisms. In one aspect of the present invention, in lieu of or in addition to the spring 66, any or all of the brace 52 and the support arm holder 62 may be formed of various elastomeric materials, as previously described. In this aspect, the anchor piece 56 defines the cavity 61, which is located near an anchor area 60. The support arm holder 62 is larger than the cavity 61 as defined by the protruding stops 56b. As such, when the support arm holder 62 is press-fit into the cavity 61, a mating end 69 of the support arm holder 62 is pressed against the stops 56b and in turn, the anchor area 60 deformably yields to fix the support arm holder 62 in the cavity 61. Stated another way, a deforming action of the deformable material of at least the anchor area 60 substitutes for the spring 66 and/or the teeth 58 of the brace 52 and the complementary teeth 64 of the support arm holder 62. It is to be understood that the brace 52 could alternatively be formed of a harder material and the support arm holder 62 be formed of the more deformable material to reach the same result as above.

Any adhesive substance such as glue, a heat-activated glue substance, a paste, an adhesive, an epoxy, or an epoxy resin may be utilized. Alternatively, the end portions $S_1$, $S_2$ may be secured with mechanical devices such as cotter keys, pins, rivets, screws or bolts. It is to be understood that end portions $S_1$, $S_2$ and their respective mating recesses need not be circular shaped as illustrated. For instance, these elements may be square, rectangular, oval, star-shaped, or various other shapes and may exhibit other geometries and orientations and be within the scope of the invention.

In light of this description, it will be apparent to those skilled in the art that various modifications and variations can be made in the present invention without departing from the scope and spirit of the invention. For example, specific shapes of various elements of the illustrated embodiments may be altered to suit particular applications. In particular, the orientation of extensions 18 and 26 may be reversed so that either may be atop the other. Also, the location of the surfaces 22 and 30 may be reversed so that either may extend out or comprise a cavity for receiving the other. It is intended that the present invention include such modifications and variations as come within the scope of the appended claims and their equivalents.

What is claimed is:

1. A locking system mounting a mirror with a motor vehicle between undefined and defined adjusted positions comprising:
   a support arm supporting said mirror between first and second ends;
   a brace secured with said vehicle supporting a first end of said support arm between fixed defined rotatable adjustable positions;
   a locking device comprising interconnected first and second extensions, located generally vertically of said brace, said first extension being secured with said vehicle and said second extension being secured with said second end of said support arm;
   a first conical surface having a central opening carried by said first extension and a second conical surface having a central opening carried by said second extension;
   said first and second conical surfaces being sized to fit in a snug manner one within the other over an extent of said conical surfaces;
   a locking member extending through said openings to engage outer surfaces of said first and second extensions, said locking member being operative in a first position to urge said conical surfaces into generally fixed relative positions and in a second position to allow undefined three dimensional movement between said conical surfaces; wherein,
   movement between said conical surfaces of said locking device brings about movement of said second end of said support arm resulting in slight adjustments between undefined positions of said mirror without movement of said first end from a defined fixed position.

2. A mirror mounting assembly on a vehicle comprising:
   a support arm having first and second ends separated with an intermediate portion supporting a mirror;
   a brace secured with said vehicle, said brace including an anchor piece and an arm holder supporting said first end of said support arm between selected defined positions;
   a locking device mounted with said vehicle in vertically spaced position from said brace, said locking device having a first extension connected with said vehicle and a second extension connected with said first extension, said second end of said support arm being carried by said second extension;
   said first extension having a conically shaped surface and said second extension having a complementary conically shaped surface, said conically shaped surface and said complementary conically shaped surface filling one in the other providing extended surface contact;
   a locking member engaged between said conically and complementary conically shaped surfaces, said locking member in a first position being operative to urge said conically and complementary conically shaped surfaces against each other in fixed position and in a second position allowing separation between said conically and complementary conically shaped surfaces allowing three dimensional relative movement; wherein,
   said three dimensional relative movement between said conically and complementary conically shaped surfaces repositions the second end of said support arm between undefined positions adjusting said mirror between undefined positions and relative movement between said arm holder and said anchor piece repositions the first end of said support arm between defined positions adjusting said mirror between defined positions.

3. The assembly of claim 2 wherein said conically shaped and said complementary conically shaped surfaces have a hole there through and said locking member comprises a key which passes through said holes, said key being operative to urge said conically shaped surfaces into contact and a fixed stationary position and to allow separation between said surfaces allowing relative adjustable movement.

4. The assembly of claim 2 wherein said anchor piece and said arm holder includes mating teeth which intermesh, retaining and positioning said arm holder between defined positions.

* * * * *